(12) United States Patent
Tosi et al.

(10) Patent No.: US 6,939,083 B2
(45) Date of Patent: Sep. 6, 2005

(54) APPARATUS AND METHOD FOR CONNECTING PIPES DURING UNDERWATER PIPE-LAYING

(75) Inventors: Luciano Tosi, Fiorenzuola (IT); Renato Bonelli, Matelica (IT)

(73) Assignee: Saipem S.p.A., Milan (IT)

( * ) Notice: Subject to any disclaimer, the term of this patent is extended or adjusted under 35 U.S.C. 154(b) by 0 days.

(21) Appl. No.: 10/473,015

(22) PCT Filed: Mar. 26, 2002

(86) PCT No.: PCT/EP02/04195

§ 371 (c)(1),
(2), (4) Date: Jan. 13, 2004

(87) PCT Pub. No.: WO02/077507

PCT Pub. Date: Oct. 3, 2002

(65) Prior Publication Data

US 2004/0131425 A1 Jul. 8, 2004

(30) Foreign Application Priority Data

Mar. 27, 2001 (GB) .............................. 0107637

(51) Int. Cl.[7] ................................. F16L 1/12
(52) U.S. Cl. .................. 405/170; 405/169; 405/184.5; 285/286; 285/288.1; 285/288.5
(58) Field of Search ................................. 405/169, 170, 405/184.5; 138/155; 285/22, 288.1, 285.1, 286, 288.5; 228/214, 262.41; 219/106, 137 R

(56) References Cited

U.S. PATENT DOCUMENTS

| | | |
|---|---|---|
| 1,220,189 A | 3/1917 | Chapman |
| 1,630,037 A | 5/1927 | Stresau |
| 1,987,341 A | 1/1935 | Kachel |
| 2,215,460 A | 9/1940 | Childress |
| 2,409,865 A | 10/1946 | Jewell |
| 2,696,835 A | 12/1954 | Kaiser |
| 2,792,490 A | 5/1957 | Risch et al. |
| 3,266,256 A | 8/1966 | Postlewaite et al. |
| 3,389,563 A | 6/1968 | Postlewaite et al. |
| 3,440,826 A | 4/1969 | Kline |
| 3,524,326 A | 8/1970 | Craste |
| 3,555,835 A | 1/1971 | Smith |
| 3,581,506 A | 6/1971 | Howard |
| 3,585,806 A | 6/1971 | Lawrence |

(Continued)

FOREIGN PATENT DOCUMENTS

| | | |
|---|---|---|
| DE | 2 118 360 | 10/1971 |
| DE | 1 625 957 | 4/1972 |
| DE | 36 15 947 C1 | 10/1987 |

(Continued)

OTHER PUBLICATIONS

D. Koening et al., *Deepwater Pipelaying Method With A New Welding Tecyhnique and J–Curved Pipestring* (Offshore Technology Conferences 3522, Apr. 30–May 1, 1979) pp. 1417–1426 plus drawings.

(Continued)

*Primary Examiner*—Jong-Suk (James) Lee
(74) *Attorney, Agent, or Firm*—Burns, Doane, Swecker & Mathis, L.L.P.

(57) ABSTRACT

A method of welding together the ends of outer pipe sections (16A, 16B) of pipe-in-pipe pipeline to be laid on a seabed employs an annular member (5) interposed between adjacent lengths of pipe. The annular member comprises a first axial part (11) which fits within the end of the first outer pipe section, and a flange part (12) which is interposed between the adjacent ends of the two lengths of outer pipe sections (16A, 16B) to be joined. The flange part (12) of the annular member (5) projects radially outwardly beyond the inside of the outer pipe sections (16A, 16B) and terminates radially inwardly of the outside of the outer pipe sections (16A, 16B), and provides some of the welding material for the joint.

14 Claims, 3 Drawing Sheets

U.S. PATENT DOCUMENTS

| | | | |
|---|---|---|---|
| 3,680,322 A | 8/1972 | Nolan, Jr. et al. | |
| 3,777,115 A | 12/1973 | Kazlauskas et al. | |
| 3,800,116 A | 3/1974 | Tanaka et al. | |
| 3,802,209 A | 4/1974 | Weaver | |
| 3,860,122 A | 1/1975 | Cernosek | |
| 3,974,356 A | 8/1976 | Nelson et al. | |
| 4,067,534 A * | 1/1978 | Frey | 285/319 |
| 4,068,490 A | 1/1978 | Jegousse | |
| 4,112,698 A | 9/1978 | Lammert et al. | |
| 4,145,593 A | 3/1979 | Merrick et al. | |
| 4,151,395 A | 4/1979 | Kushner et al. | |
| 4,234,268 A | 11/1980 | Scodino | |
| 4,283,617 A | 8/1981 | Merrick et al. | |
| 4,345,855 A | 8/1982 | Uyeda et al. | |
| 4,350,868 A | 9/1982 | Takagi et al. | |
| 4,373,125 A | 2/1983 | Kazlauskas | |
| 4,380,695 A | 4/1983 | Nelson | |
| 4,408,112 A | 10/1983 | Kazlauskas | |
| 4,417,126 A | 11/1983 | Kasahara et al. | |
| 4,441,011 A | 4/1984 | Nomura et al. | |
| 4,444,528 A | 4/1984 | Scodino et al. | |
| 4,485,291 A | 11/1984 | Nomura et al. | |
| 4,486,123 A | 12/1984 | Koch et al. | |
| 4,495,400 A | 1/1985 | Thompson | |
| 4,525,616 A | 6/1985 | Slavens | |
| 4,591,294 A | 5/1986 | Foulkes | |
| 4,631,386 A | 12/1986 | Slavens | |
| 4,721,410 A | 1/1988 | Recalde | |
| 4,765,776 A | 8/1988 | Howson | |
| 4,822,230 A | 4/1989 | Slettedal | |
| 4,834,604 A | 5/1989 | Brittain et al. | |
| 4,854,400 A | 8/1989 | Simpson | |
| 4,865,359 A | 9/1989 | Roberts | |
| 4,990,743 A | 2/1991 | Kugai et al. | |
| 5,030,812 A | 7/1991 | Sugitani et al. | |
| 5,126,523 A | 6/1992 | Rinaldi | |
| 5,146,064 A | 9/1992 | Poirier | |
| 5,248,080 A * | 9/1993 | Stapleton | 228/175 |
| 5,347,101 A | 9/1994 | Brennan et al. | |
| 5,368,223 A | 11/1994 | Chevrel et al. | |
| 5,421,675 A | 6/1995 | Brown et al. | |
| 5,464,307 A | 11/1995 | Wilkins | |
| 6,124,566 A | 9/2000 | Belloni et al. | |
| 6,142,359 A | 11/2000 | Corbishley et al. | |
| 6,273,643 B1 | 8/2001 | Baugh | |
| 6,352,388 B1 | 3/2002 | Seguin | |
| 6,361,250 B1 | 3/2002 | de Varax | |
| 6,429,405 B2 | 8/2002 | Belloni et al. | |
| 6,524,030 B1 | 2/2003 | Giovannini et al. | |

FOREIGN PATENT DOCUMENTS

| | | |
|---|---|---|
| EP | 0 021 856 A1 | 1/1981 |
| EP | 0 076 018 A1 | 4/1983 |
| EP | 0 153 979 A1 | 9/1985 |
| EP | 0 262 545 A1 | 4/1988 |
| EP | 0 271 184 A1 | 6/1988 |
| EP | 0 402 648 A2 | 12/1990 |
| EP | 0 439 975 A1 | 8/1991 |
| EP | 0 657 670 B1 | 6/1995 |
| EP | 0 661 488 B1 | 7/1995 |
| EP | 0 706 849 A1 | 4/1996 |
| EP | 0 852 984 A1 | 7/1998 |
| GB | 1107541 | 3/1968 |
| GB | 1178219 | 1/1970 |
| GB | 2 095 787 A | 10/1982 |
| GB | 2 204 106 A | 11/1988 |
| GB | 2 258 030 A | 1/1993 |
| GB | 2 322 423 A | 8/1998 |
| GB | 2 339 251 A | 1/2000 |
| JP | 59-191575 | 10/1984 |
| JP | 62-118976 | 5/1987 |
| NL | 330 519 | 10/1998 |
| WO | 91/09700 | 7/1991 |

OTHER PUBLICATIONS

*Installation of an Internally Clad Pipeline Using the J–Lay Method* (*Offshore Technology Conferences 7016*, May 4–7, 1992) pp. 311–318.

S.P. Springmann et al., *Deepwater Pipelaying Operations and Techniques Utilizing J–Lay Methods* (*Offshore Technology Conferences*, May 2–5, 1994) pp. 439–448.

*J–lay makes its deep debut* (*Offshore Engineer*, Jul. 1993) pp. 12–15.

*CRP Marine, Flexible Pipe Accessories* (advertisement–*Offshore Engineer*, Aug. 1992) p. 110.

*Yesterday's J–lay* (*Offshore Engineer*, Mar. 1992 p. 41.

*Maui sets stem for J–Lay debut—A new angle on pipelay* (*Offshore Engineer*, Feb. 1992) pp. 14–16.

*Innovations help guarantee future of laybarge technique* (*Offshore Incorporating The Oilman*, Jan. 1992) p. 66.

*Smith Berger Innovation: Deep Water Mooring Systems* (*Offshore Incorporating The Oilman*, Apr. 1989) p. 18.

*Smith Berger Innovation: Deep Water Mooring Systems* (*Offshore Incorporating The Oilman*, Oct. 1989) p. 47.

*Vessels for hire at season's peak* (*The Oilman*, Jul., 1991) p. 64.

*Pipe Handling Systems—The Rigs of Tomorrow* (*Varco BJ Drilling Systems*, date unknown).

European Patent No. EP 0 657 670, Oct. 27, 1999, McDermott International, Inc., Opposition by Saipem Luxembourg S.A.

European Patent No. EP 0 661 488, Jun. 23, 1999, McDermott International, Inc., Opposition by Saipem Luxembourg S.A.

* cited by examiner

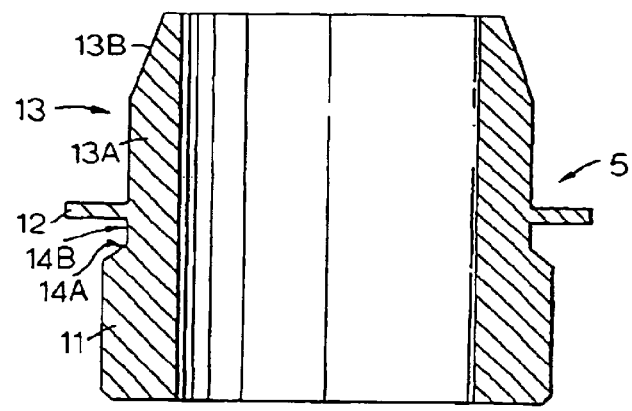
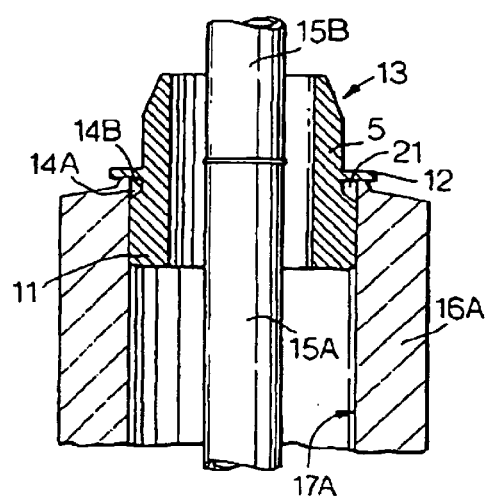
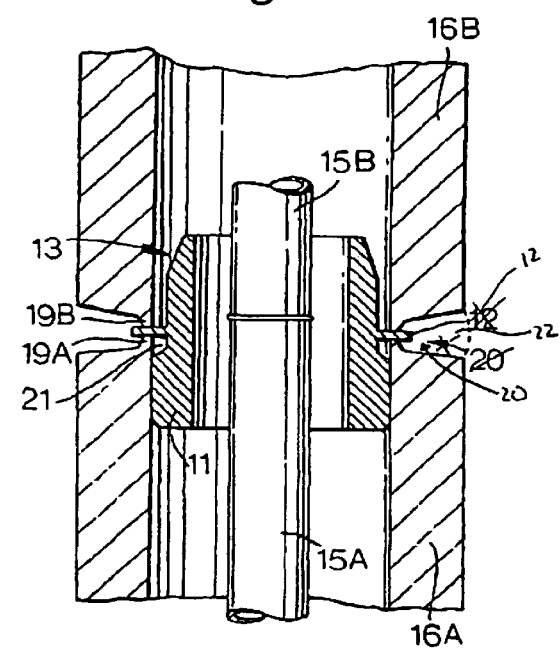

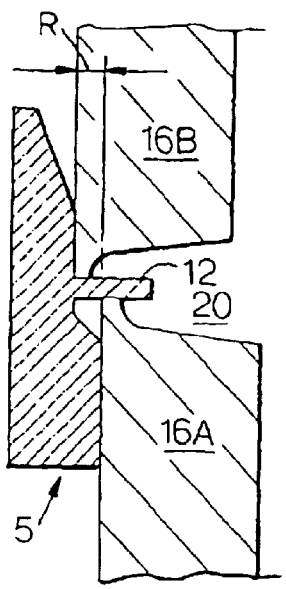
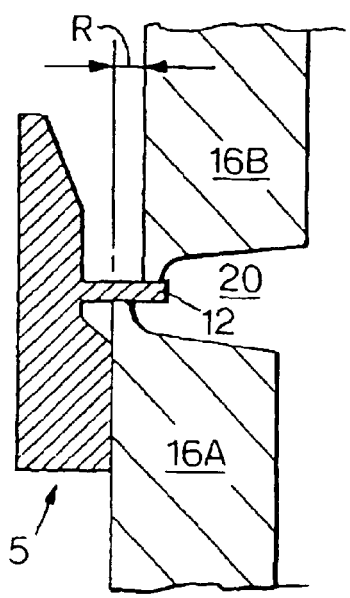
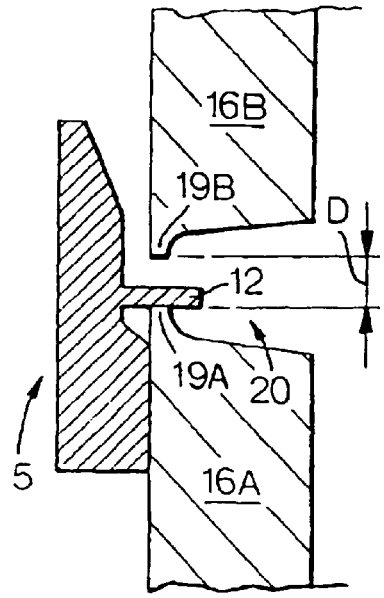

APPARATUS AND METHOD FOR CONNECTING PIPES DURING UNDERWATER PIPE-LAYING

CROSS REFERENCE TO RELATED APPLICATION

This application is a national stage of PCT/EP02/04195 filed on Mar. 26, 2002 and based upon United Kingdom 0107637.1 filed Mar. 27, 2001.

BACKGROUND OF THE INVENTION

1. Field of the Invention
2. Description of the Related Art

The invention relates to a method of laying a pipeline on a seabed and to a member for assisting in the laying of pipelines on a seabed.

A traditional approach to laying pipelines at sea is a technique known as "S-laying". This technique involves laying pipeline from a vessel with the pipeline inclined by a small inclination such as 5 or 10 degrees to the horizontal as it leaves the vessel.

A more recent approach involves a technique known as "J-laying", in which the pipeline leaves the vessel at a much steeper angle which may even be vertical. This method is especially suitable for laying a pipeline in deep water.

A problem associated with J-laying is the means by which additional pipe sections are added to the pipeline. Because of the steep angle of the pipeline at the vessel, the length of pipeline above sea level that can be worked on at any one time is much more restricted than in S-laying and therefore the scope for having several working stations along the length of the pipeline for working on connections of pipe sections, as is commonplace in S-laying, is much reduced.

Further problems are encountered when the pipeline in question uses what is commonly referred to as a "pipe-in-pipe" design. This design uses an inner pipe and an outer pipe. The inner pipe is used to carry fluid along the pipeline; insulation is provided around the inner pipe and the outer pipe surrounds the inner pipe and is provided to contain and protect the insulation. This configuration is commonly used to carry hot well fluids along a pipeline.

The lengths of pipeline are usually connected by butt welding. Sometimes a backing ring is placed inside the pipe at the butt joint to improve the welded joint that is obtained. The use of a pipe-in-pipe design complicates this welding process because the inner pipe must be welded before the outer pipe can be welded, so that two separate welding operations are required at one joint. Thus the time taken to complete a welded joint becomes more critical.

SUMMARY AND OBJECTS

A particular problem arises with welding of the ends of the outer pipe in a pipe-in-pipe design because those ends do not generally need to be prepared to such close tolerances as the inner pipe and it is therefore possible for there to be a significant mismatch of the ends of the outer pipe to be welded. Such a mismatch is liable to cause a conventional butt welding process to provide an inadequate joint and/or take too long to provide a sufficiently good joint.

It is an object of the present invention to provide a method for laying a pipeline of a pipe-in-pipe design that reduces some of the problems described above in relation to welding of the outer pipes.

According to the invention there is provided a method of laying a pipeline on a seabed, in which the pipeline comprises inner pipe lengths connected together and outer pipe lengths connected together around the inner pipe lengths and in which outer lengths of pipe are joined to the pipeline as it is laid by a welding process involving the following steps for welding the end of a length of a first outer pipe to the end of a length of a second outer pipe:

fitting an annular member in the end of the first outer pipe with a first axial part of the member within the first outer pipe and a second flange part of the member projecting radially outwardly beyond the inside of the first outer pipe and terminating radially inwardly of the outside of the first outer pipe;

bringing the end of the second outer pipe into a position substantially axially aligned with and confronting the end of the first outer pipe, with the second flange part of the annular member interposed between the confronting ends of the first and second outer pipes, the second flange part projecting radially outwardly beyond the inside of the second outer pipe and terminating radially inwardly of the outside of the second outer pipe; and welding the confronting ends of the first and second outer pipes together, the second flange part of the annular member providing some of the welding material.

The use of an annular member with a flange part interposed between the confronting ends of the first and second outer pipes enables a much better weld to be obtained easily, both when the ends of the outer pipes are dimensioned and arranged very precisely and when they are dimensioned and arranged to relatively wide tolerances. When such tolerances are allowed, nominally circular pipes may be significantly non-circular and the end of a pipe may not lie fully in a single plane perpendicular to the axis of the pipe; in such cases there will inevitably be gaps between, or non-alignment of, certain confronting portions of the ends of the first and second outer pipes. The flanged annular member is, however, able to reduce the deleterious effect of such tolerances on the welding operation.

Usually the welding process will be carried out as a new length of outer pipe is joined to the end of the pipeline. In that case the first outer pipe is at the end of the pipeline and the second outer pipe extends the pipeline once it has been welded to the first outer pipe. It will be appreciated that each of the first and second outer pipes may itself be formed of a number of separate pipe sections joined end-to-end in separate operations that may be carried out on shore; in a typical case four individual pipe sections may be welded to one another to form a first or second outer pipe, which may have a length of the order of 50 m.

In an especially advantageous embodiment of the invention, the annular member includes a third axial part which is inserted within the end of the second outer pipe when the end of the second outer pipe is brought into the position confronting the end of the first outer pipe. Such an arrangement can assist in ensuring good alignment of the ends of the first and second outer pipes. Preferably, the third axial part reduces in external diameter with increasing axial spacing from the second flange part, whereby the end of the second outer pipe is guided into a position substantially axially aligned with the end of the first outer pipe as it is brought into the position confronting the end of the first outer pipe; preferably the third axial part of the annular member comprises a base portion of substantially constant diameter and a distal end portion of progressively reducing diameter; a reduction in diameter of this kind facilitates the introduction of the third axial part into the end of the second outer pipe and the subsequent aligning of the ends of the outer pipes. It will be understood that usually the first axial part is a loose fit in the first outer pipe and, similarly, that usually the third axial part is a loose fit in the second outer pipe.

It is preferred that the first and second axial parts each define continuous ring portions of the annular member and extend around the whole of the member; an alternative possibility, however, for the first and second axial parts and especially for the distal ends of those parts is for them to be discontinuous in a circumferential direction. Similarly the second flange part may be discontinuous and/or of variable radial extent (depth) and/or thickness around the annular member but preferably is continuous, preferably is of substantially constant radial extent and preferably is of substantially constant thickness around the annular member.

Preferably the first axial part of the annular member includes a portion of reduced external diameter adjacent to the flange part, whereby, when the annular member is fitted in the end of the first outer pipe, an annular cavity is formed between the annular member and the inside of the end of the first outer pipe, the cavity being defined by the inside of the first outer pipe, the outside of the reduced external diameter portion of the first axial part and the flange part. The provision of the annular cavity assists in providing a reasonably consistent spacing of the annular member from the first outer pipe around the circumference of the annular member and immediately below the flange part, despite any tolerance variations in the dimensions of the first outer pipe.

Generally, it is preferred that the second flange part projects only a relatively small part of the way from the insides of the first and second outer pipes to the outsides. More particularly, it is preferred that the second flange part terminates at a location radially closer to the insides than to the outsides of the first and second outer pipes.

Preferably, the ends of the lengths of the first and second outer pipes are at an angle steeper than 45 degrees to the horizontal when the ends are welded together. With such steep inclination the number of welding stations at which work can be carried out simultaneously on pipe connections is limited by height consideration and the invention is therefore of particular relevance. Thus the invention preferably comprises J-laying of a pipeline.

The present invention further provides a pipeline laid on a seabed by a method as defined above. The pipeline may include any of the constructional features that are implicit or explicit from the description above.

The present invention still further provides an annular member for fitting in the end of a first outer pipe of a pipe-in-pipe pipeline during the process of welding the first outer pipe to a second outer pipe in a method of laying a pipeline on a seabed, the annular member including a first axial part for fitting within an end of the first outer pipe, a second flange part projecting radially outwardly beyond the first axial part, and a third axial part for insertion within an end of the second outer pipe when the end of the second outer pipe is brought into a position confronting the end of the first outer pipe, the second flange part also projecting radially outwardly beyond the second axial part.

The second flange part may project outwardly beyond the first and second axial parts by a distance in the range of from 1 to 7 mm, more preferably by an amount in the range of 2 to 5 mm. Such a distance is likely to be small compared to the thickness of a pipe.

The second flange part preferably has a thickness in the range of 0.5 to 2 mm and more preferably of the order of 1 mm. Thus the second flange part is preferably relatively thin.

The overall diameter of the annular member is of course determined by the diameters of the first and second outer pipes to be joined but will typically lie in the range of about 100 mm to about 1000 mm. Thus in the preferred form of the annular member, the thickness of the flange part is less than one hundredth of the overall diameter of the annular member.

The annular member may include any of the constructional features that are implicit or explicit from the description above of the way in which the annular member is to be used in a method of laying a pipeline on a seabed. Similarly, the annular member employed in the method may be of any of the forms just described and may have dimensions lying in the ranges indicated.

BRIEF DESCRIPTION OF THE DRAWINGS

An embodiment of the invention will now be described by way of example with reference to the accompanying drawings, in which:

FIG. 2 shows, in cross-section, an annular member used in a welding process during the laying of the pipeline shown in FIG. 1;

FIG. 3A shows schematically, in cross-section, the annular member of FIG. 2 being used in a welding process;

FIG. 3B shows schematically, in cross-section, the annular member of FIG. 2 being used in the same welding process as in FIG. 3A but at a subsequent stage;

FIG. 4A shows, in cross-section, misalignment between pipe ends to be joined by welding;

FIG. 4B shows, in cross-section, another misalignment between pipe ends to be joined together by welding; and FIG. 4C shows, in cross-section, yet another misalignment between pipe ends to be joined by welding.

DESCRIPTION OF THE PREFERRED EMBODIMENTS

Figure 1:
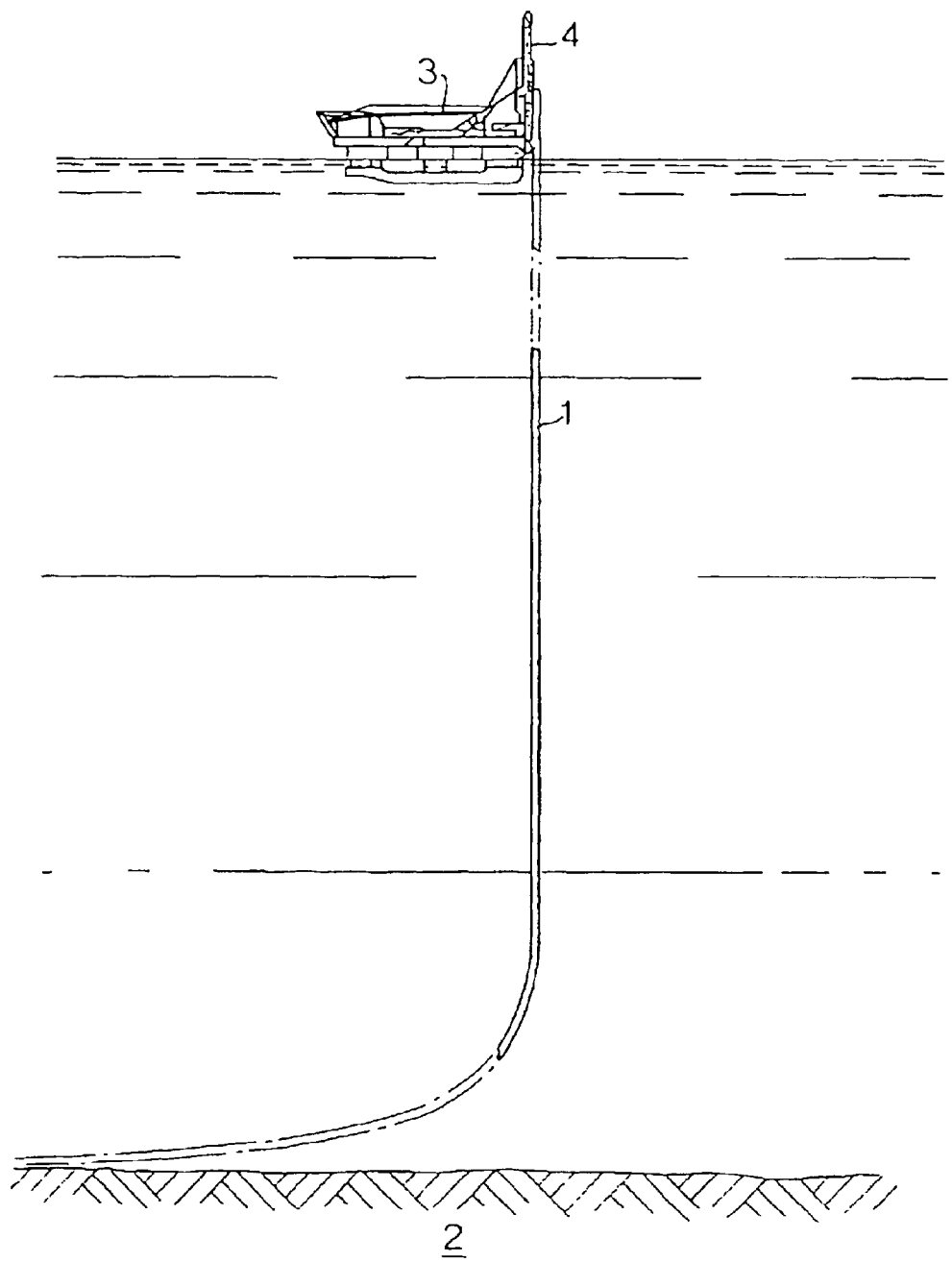
FIG. 1 shows a pipeline being laid on the seabed by a J-laying technique.

FIG. 1 shows a pipeline 1 being laid on a seabed 2 by a J-laying technique using a vessel 3. The vessel 3 has a tower 4, which is shown in FIG. 1 as vertical but may also be adjusted to an angle inclined to the vertical. The upper end of the pipeline 1 is supported by appropriate means of the tower 4 and is lowered down the tower as the pipeline is laid. Additional lengths of pipeline are welded to the upper end of the pipeline as it passes down the tower 4. In the example described, the pipeline 1 is of a pipe-in-pipe design.

The general technique of J-laying is itself well known and will not be described further here. The distinctive aspect of the present invention concerns the use of an annular member or ring 5, shown in FIG. 2 during the step of welding together the confronting ends of the outer pipes of two pipe-in-pipe lengths of pipeline.

The ring 5 shown in FIG. 2 is made of steel and generally comprises a first axial part 11, a second flange part 12 and a third axial part 13. The first axial part 11 is of generally circular cylindrical shape except in an uppermost region (as seen in FIG. 2) where the external diameter first reduces progressively to define a sloping face 14A and is then maintained at the reduced diameter along a face 14B until the flange part 12 is reached.

The flange part 12 comprises a continuous circular flange of constant diameter around the ring and also of constant thickness (depth).

The third axial part 13 is of generally circular cylindrical shape and has a lower portion 13A of constant external diameter and an upper portion 13B of progressively reducing external diameter.

As can be seen from FIG. 2, the ring 5 is of constant internal diameter throughout its axial length.

In one particular example of the invention the ring 5 has the following dimensions:

| | |
|---|---|
| overall diameter: | 377 mm |
| overall axial length: | 30 mm |
| thickness of flange part 12: | 1.0 mm |
| overall diameter of axial part 11: | 371 mm |
| diameter of axial part 11 at face 14B | 367 mm |
| diameter of flange part 12: | 377 mm |
| thickness of lower portion of axial part 11: | 6.0 mm |
| thickness of uppermost portion of axial part 11: | 4.0 mm |
| thickness of part 13A: | 4.0 mm |

It will be apparent from the dimensions given above that in practice the ring 5 is much wider and shallower than is shown in FIG. 2.

FIG. 3A shows the ring 5 during its use when welding two pipe lengths together. At the stage shown in FIG. 3 the ends of inner pipes 15A and 15B have already been welded together and, prior to the welding together of the pipes, the ring 5 has been fitted into the outer pipe 16A. As can be seen in FIG. 3A, the axial part 11 of the ring 5 fits snugly within the inside 17A of the outer pipe 16A and the flange part 12 rests on the end of the outer pipe 16A. Although the ring 5 is shown as a close fit in the pipe 16A, the ring may be a looser fit in the event that the diameter of the pipe 16A is towards the upper end of its range of tolerances. The faces 14A and 14B together with the inside of the pipe 16A and part of the bottom face of the flange part 12 define an annular recess or cavity 21. At this stage in the procedure, the upper outer pipe 16B is held above and clear of the joint allowing access to weld the inner pipes 15A and 15B together.

The outer pipe 16B is then lowered to the position shown in FIG. 3B, in which the end of the pipe 16B rests on the flange part 12 and the third axial part 13 is inserted in the inside 17B of the end of the pipe 16B. As the pipe 16B is lowered the tapered upper portion 13B of the ring 5 assists in guiding the pipe into a correct radial position relative to the lower pipe 16A. It will be noted that the external diameter of the part 13 of the ring 5 is less than the diameter of the inside of the pipe 16B so that variations in the diameter, wall thickness and/or non-circularity of the pipe 16B and/or radial misalignment of the pipes 16A and 16B can be accommodated. As shown in the drawings the confronting end faces of the pipes 16A, 16B are each formed in a shape known per se such that when butted together, inner portions 19A and 19B contact one another and an annular recess of generally 'U' shaped section is formed immediately outside the inner portions 19A and 19B. As can be seen in FIG. 3B, substantially the same shape of joint with a recess 20 is formed in the present case except that the flange part 12 is interposed between the confronting end faces, separates the portions 19A and 19B and projects into the recess 20. Typically, for a ring 5 of the size described, the thickness of the pipes 16A, 16B is in the range of 12.5 to 15 mm.

Once the parts are in the position shown in FIG. 3B, the ends of the pipes 16A, 16B can be welded together in a manner known per Se, with weld material 22 filling the recess 20. During the welding operation the parts of the pipes 16A, 16B bordering the recess 20 fuse, together with at least part of the flange part 12 and surface portions of the axial parts 11 and 13 adjacent to the recess 20. Weld material also flows into the recess 21 immediately below the flange part 12 during the welding process and that improves the weld to the lower pipe 16A, promoting full fusion in the region of the root of the weld. The existence of the recess 21 ensures that even with relatively wide tolerance variation in the internal diameter of the lower pipe 16A there is a continuous annular cavity between the lower pipe 16A and the part of the ring 5 immediately below the flange part 12, thereby ensuring more uniform conditions for welding.

We have found that the provision of the ring 5 results in a more reliable weld joint being obtained more easily. That is especially true when, unlike the situation illustrated in FIGS. 3A and 3B the alignment between the outer pipes 16A and 16B is not exact. Examples of misalignment are shown in FIGS. 4A to 4C.

In FIG. 4A a radial misalignment by an amount marked 'R', between the lower pipe 16A and the upper pipe 16B is shown. Such a radial misalignment may be caused by a difference in diameter between the two pipe ends, but more probably will be caused by a non-circularity in one or both pipes, or a radial misalignment of the pipes. In the latter case, there may well be an opposite radial misalignment in the pipes at the diametrically opposite region of the joint, as shown in FIG. 4B where the misalignment is again marked 'R'. Of course, the misalignment shown in FIG. 4B could alternatively be caused by a difference in diameter between the two pipe ends. When the dimensions of the ring 5 are as indicated above, a value of R of up to 2 mm can be satisfactorily accommodated. It will be appreciated that variations in wall thickness of the pipes can also be accommodated in a similar manner.

In FIG. 4C a different kind of misalignment is illustrated. In this case, the end faces defined by the portions 19A and 19B are not both in respective single planes exactly perpendicular to the longitudinal axis of the pipe. As a result, the portion 19B of the upper pipe 16B is spaced from the flange part 12 by an axial distance marked 'D' in the drawing. It will be appreciated that at some other circumferential region the portion 19B is in contact with the flange part 12. Similarly there may be another circumferential region where the portion 19A of the lower pipe 16A is not in contact with the flange part 12. When the dimensions of the ring 5 are as indicated above a value of D of up to 3 mm can be satisfactorily accommodated.

In the examples described above, the presence of the ring 5 assists in reducing misalignment of the pipes and also in retaining the weld pool at the welding location during the welding process, even when there are significant variations in pipe diameters or pipe end faces.

What is claimed is:

1. A method of laying pipeline on a seabed, in which the pipeline comprises inner pipe lengths connected together and outer pipe lengths connected together around the inner pipe lengths and in which the outer pipe lengths are joined to the pipeline as it is laid by a welding process involving the following steps for welding the end of a length of a first outer pipe to the end of a length of a second outer pipe:

fitting an annular member in the end of the first outer pipe with a first axial part of the member within the first outer pipe and a second flange part of the member projecting radially outwardly beyond the inside of the first outer pipe and terminating radially inwardly of the outside of the first outer pipe;

bringing the end of the second outer pipe into a position substantially axially aligned with and confronting the end of the first outer pipe, with the second flange part of the annular member interposed between the confronting ends of the first and second outer pipes, the second flange part projecting radially outwardly beyond the inside of the second outer pipe and terminating radially inwardly of the outside of the second outer pipe;

welding the confronting ends of the first and second outer pipes together, the second flange part of the annular member providing some of the welding material; and in which the first axial part of the annular member includes a portion of reduced external diameter adjacent to the flange part, whereby, when the annular member is fitted in the end of the first outer pipe, an annular cavity is formed between the annular member and the inside of the end of the first outer pipe, the cavity being defined by the inside of the first outer pipe, the outside of the reduced external diameter portion of the first axial part and the flange part.

2. A method according to claim 1, in which the first outer pipe is at the end of the pipeline and the second outer pipe extends the pipeline once it has been welded to the first outer pipe.

3. A method according to claim 1, in which the annular member includes a third axial part which is inserted within the end of the second outer pipe when the end of the second outer pipe is brought into the position confronting the end of the first outer pipe.

4. A method according to claim 3, in which the third axial part reduces in external diameter with increasing axial spacing from the second flange part, whereby the end of the second outer pipe is guided into a position substantially axially aligned with the end of the first outer pipe as it is brought into the position confronting the end of the first outer pipe.

5. A method according to claim 4, in which the third axial part of the annular member comprises a base portion of substantially constant diameter and a distal end portion of progressively reducing diameter.

6. A method according to claim 1, in which the second flange part is continuous around the annular member and of substantially constant radial extent.

7. A method according to claim 1, in which the second flange part is of substantially constant thickness.

8. A method according to claim 1, in which the second flange part terminates at a location radially closer to the insides than to the outsides of the first and second pipes.

9. A method according to claim 1, in which the ends of the lengths of the first and second outer pipes are at an angle steeper than 45 degrees to the horizontal when the ends are welded together.

10. A pipeline laid on a seabed by a method according to claim 1.

11. An annular member for fitting in the end of a first outer pipe of a pipe-in-pipe pipeline during the process of welding the first outer pipe to a second outer pipe in a method of laying a pipeline on a seabed, the annular member including a first axial part for fitting within an end of the first outer pipe, a second flange part projecting radially outwardly beyond the first axial part, the first axial part of the annular member including a portion of reduced external diameter adjacent to the flange part, whereby, when the annular member is fitted in the end of the first outer pipe, an annular cavity is formed between the annular member and the inside of the end of the first outer pipe, the cavity being defined by the inside of the first outer pipe, the outside of the reduced external diameter portion of the first axial part and the flange part, and the annular member further including a third axial part for insertion within an end of the second outer pipe when the end of the second outer pipe is brought into a position confronting the end of the first outer pipe, the second flange part also projecting radially outwardly beyond the second axial part.

12. An annular member according to claim 11, in which the second flange part projects radially outwardly beyond the first and second axial parts by a distance in the range from 1 to 7 mm.

13. An annular member according to claim 11, in which the second flange part has a thickness in the range of from 0.5 to 2 mm.

14. An annular member according to claim 11, in which the thickness of the second flange part is less than one hundredth of the overall diameter of the member.

* * * * *